No. 893,584.  
PATENTED JULY 14, 1908.  
W. A. HIGGS.  
COMBINED SEED PLANTER AND FERTILIZER DISTRIBUTER.  
APPLICATION FILED SEPT. 30, 1907.  
2 SHEETS—SHEET 1.
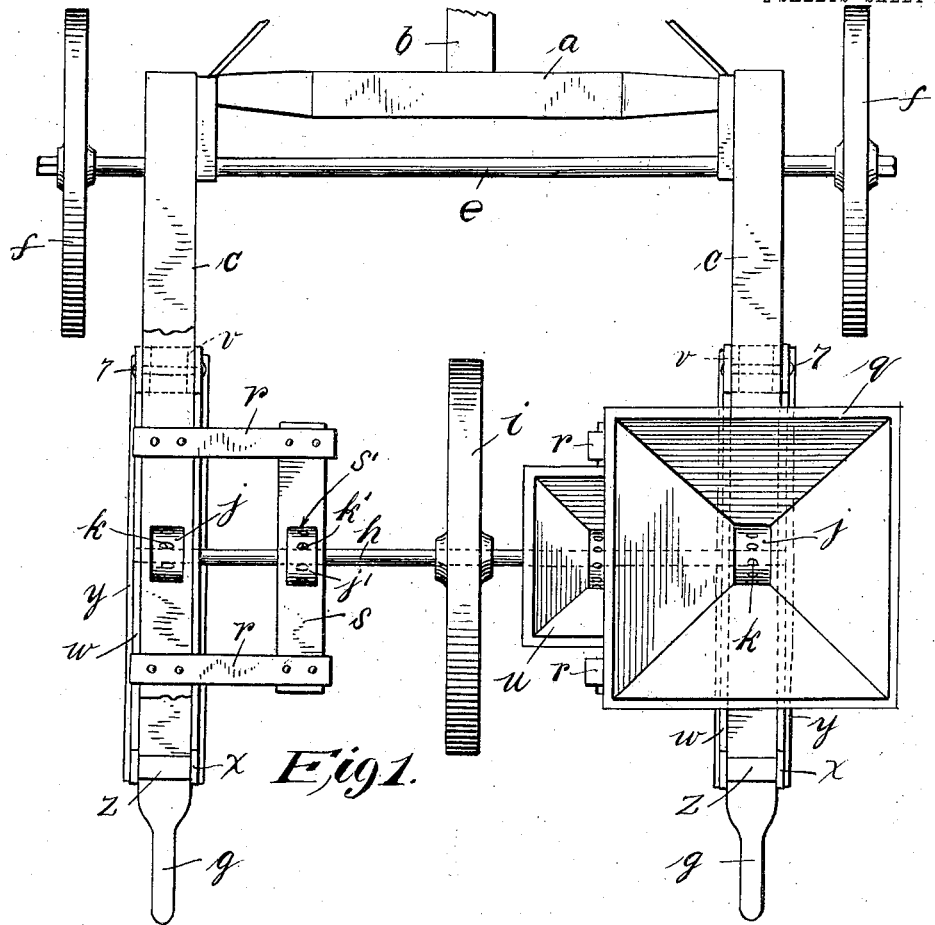
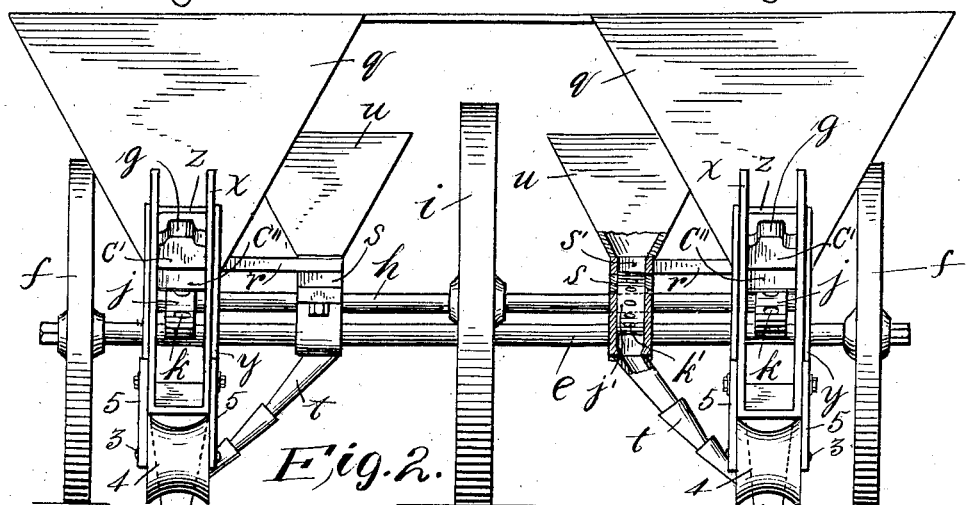
Witnesses:  
Harry C. Hebig  
M. Hamilton  
Inventor  
William A. Higgs  
By his Attorney  
James Hamilton No. 893,584.

PATENTED JULY 14, 1908.

W. A. HIGGS.
COMBINED SEED PLANTER AND FERTILIZER DISTRIBUTER.
APPLICATION FILED SEPT. 30, 1907.

2 SHEETS—SHEET 2.

Witnesses:
Harry C Hebig
M. Hamilton

William A. Higgs Inventor
By his Attorney
James Hamilton

UNITED STATES PATENT OFFICE.

WILLIAM A. HIGGS, OF CARO, MICHIGAN.

COMBINED SEED-PLANTER AND FERTILIZER-DISTRIBUTER.

No. 893,584.

Specification of Letters Patent.

Patented July 14, 1908.

Application filed September 30, 1907. Serial No. 395,068.

*To all whom it may concern:*

Be it known that I, WILLIAM A. HIGGS, a citizen of the United States, residing at Caro, in the county of Tuscola and State of Michigan, have invented certain new and useful Improvements in a Combined Seed-Planter and Fertilizer-Distributer, of which the following is a specification, reference being had to the accompanying drawings.

My invention relates to improvements in planters for sowing seed, and particularly to that class of seed planters in which a device for distributing fertilizer with the seed is provided; and an object of my invention is to provide a combined fertilizer distributer and seed planter of the character just described which will prove simple in construction, cheap in manufacture, readily operable and efficient in use.

Figure 4:
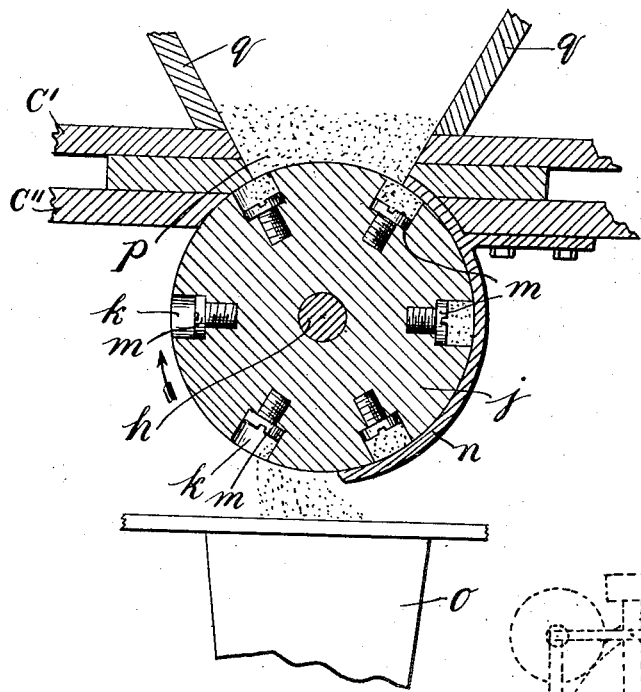
Figure 3:
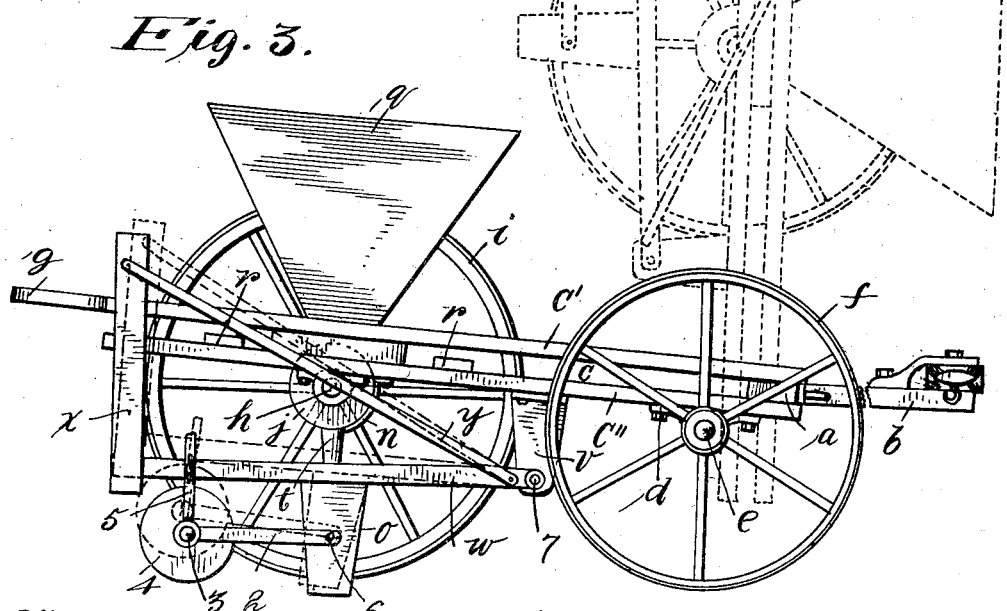

In the drawings illustrating the principle of my invention and the best mode now known to me of applying that principle, Figure 1 is a plan view, the fertilizer box and seed box on one side of the frame being shown removed; Fig. 2 is a rear elevation; Fig. 3 a side elevation, the latter showing in dotted lines the position of the planting apparatus when thrown out of use; and Fig. 4 is a fragmentary detail in section showing the seed-drum.

To the front cross-bar $a$ is connected the tongue $b$ and the side-bars $c$. The latter are two-part being made up of the upper side-bar $c'$ and the lower side-bar $c''$. On each side there is secured to the front end of the lower side-bar $c''$ a hanger or axle-box $d$ in which is rotatably mounted the axle $e$ which carries at each end a front wheel $f$. The rear end of each upper side-bar $c'$ is formed into a handle $g$ by which the planting apparatus may be raised and lowered about the front axle $e$ as is indicated by the dotted lines in Fig. 3.

Near the rear of the apparatus is mounted a shaft $h$ at the center of which is fastened a wheel $i$. The latter by its contact with the ground drives the shaft $h$. At each end of the shaft $h$ is mounted a seed-drum $j$ the cylindrical face of which is formed with pockets $k$ in which are mounted screws $m$. By turning the latter the depth of the pocket may be varied as will be obvious by inspection of Fig. 4 and thereby the amount of seed thrown down may be controlled. To the lower side-bar $c''$ is secured the guard-plate $n$ which covers nearly half the cylindrical face of the seed-drum $j$. This guard-plate serves to retain the seed in the pockets until the latter come opposite the shoe $o$, at which time each pocket $k$ passes beyond the lower end of the guard-plate and the seed drops out and falls through the shoe $o$. The upper side-bar $c'$ is formed with an opening $p$, (Fig. 4) above which is mounted the seed-box $q$ from which the seed is fed through the opening $p$ to the seed-drum $j$. To each lower side-bar $c''$ are fastened two supporting arms $r$ which extend inwardly toward the wheel $i$ (Fig. 1) and support at their inner end a bar $s$ formed with an opening $s'$ through which projects the top of the fertilizer-drum $j'$. The latter is in all essential respects similar to the seed-drum $j$. Below the fertilizer-drum $j'$ is mounted a funnel $t$ into which the fertilizer-drum discharges and which itself discharges into the shoe $o$. The parts of the funnel $t$ telescope into one another. Above the fertilizer-drum $j'$ is suitably mounted the fertilizer-box or container $u$.

Near the middle of each lower side-bar $c''$ is fastened a block $v$ to which is pivotally secured a drag bar $w$ to the rear end of which are fastened the uprights $x$. The upper end of each of the latter is connected with the bar $w$ by a brace $r$. Between the uprights $x$ extend the rear end of the lower side-bar $c''$ and of the upper side-bar $c'$ which is fastened between the uprights a cross-piece $z$. To each drag bar $w$ is fastened the shoe $o$ and to the latter are pivotally secured the arm 2 which at its rear end carries the shaft 3 upon which turns the covering wheel 4. The shaft 3 is also held in the lower end of the hanger-bars 5; the latter being adjustably secured to the bar $w$ as shown in Fig. 3. By moving the hanger-bars 5, the arms 2 may be turned about their pivotal points 6 and the position of the covering wheel 4 varied as desired. The supplementary frame made up of the members $w$, $x$, $y$ is free to move up and down about the pivotal point 7; and such movement of this frame, which may be called the shoe-frame, does not effect the main frame of the planter. However, when it is desired to throw the seeding devices out of operation, the driver grasps the handles $g$ and raises the side-bar $c$, whereby the upper side-bars $c'$ are brought against the cross-pieces $z$ lifting the shoe-frame at the same time with the other parts of the seeding apparatus. The shoe $o$ will be provided with a suitable soilcutting attachment, which is so well known to those skilled in this art as not to require further description.

I am well aware that planters have heretofore been patented in which the supplementary frame carrying the covering wheel has been attached to the main frame by flexible suspensory members, as chains, which permit freedom of oscillation of the supplementary frame. I am further well aware that planters have heretofore been patented in which both fertilizer and seed have been fed at the same time; but in my construction hereinbefore described both drums are mounted upon a common shaft and the construction is simple, compact and efficient.

I claim:

1. A planter of the class described consisting of the combination of a supporting frame provided with a side-bar; a shaft journaled in said side-bar; a wheel mounted on said shaft and adapted to contact with the ground to drive said shaft; a seed-drum mounted on said shaft; a supplementary frame pivotally secured to said side-bar and provided with a pair of uprights between which the end of said side-bar projects; a shoe mounted upon said supplementary frame below said seed-drum and adapted to cut the soil; a covering wheel mounted upon said supplementary frame in rear of said shoe; and a cross-piece mounted between said uprights above said side-bar, whereby the raising of said side-bar is adapted to throw out of action said wheels, seed-drum and shoe and to raise said supplementary frame, while the latter is free to swing in operation without transmitting motion to said side-bar.

2. A planter of the class described consisting of the combination of a supporting frame provided with a side-bar; a shaft journaled in said side-bar; a wheel mounted on said shaft and adapted to contact with the ground to drive said shaft; a seed-drum and a fertilizer-drum mounted on said shaft to rotate therewith; a hopper for the seed; a hopper for the fertilizer, both said hoppers being supported by said side-bar; a supplementary frame pivotally secured to said side-bar and provided with a pair of uprights between which the end of said side-bar projects; a shoe mounted upon said supplementary frame below said seed-drum and adapted to cut the soil; a covering wheel mounted upon said supplementary frame in rear of said shoe; a conduit connecting said hopper for the fertilizer with said shoe; and a cross-piece mounted between said uprights, said supplementary frame being free to swing upon said side-bar without transmitting its motion thereto and said side-bar being adapted to engage said cross-piece and to raise said supplementary frame, shoe and wheels out of operative position.

In witness whereof I have hereunto set my hand at said Caro this 24th day of September, A. D. 1907, in the presence of the two undersigned witnesses.

WILLIAM A. HIGGS.

Witnesses:
TIMOTHY C. QUINN,
WALTER S. WIXSON.